US007124194B2

(12) United States Patent
Nathan et al.

(10) Patent No.: US 7,124,194 B2
(45) Date of Patent: *Oct. 17, 2006

(54) AUDIOVISUAL DISTRIBUTION SYSTEM FOR PLAYING AN AUDIOVISUAL PIECE AMONG A PLURALITY OF AUDIOVISUAL DEVICES CONNECTED TO A CENTRAL SERVER THROUGH A NETWORK

(75) Inventors: Guy Nathan, Yerres (FR); Tony Mastronardi, Pierrefonds (CA)

(73) Assignee: TouchTunes Music Corporation, Las Vegas, NV (US)

( * ) Notice: Subject to any disclaimer, the term of this patent is extended or adjusted under 35 U.S.C. 154(b) by 138 days.

This patent is subject to a terminal disclaimer.

(21) Appl. No.: 10/195,476

(22) Filed: Jul. 16, 2002

(65) Prior Publication Data
US 2003/0074666 A1   Apr. 17, 2003

Related U.S. Application Data

(63) Continuation of application No. 08/817,426, filed as application No. PCT/FR95/01337 on Oct. 12, 1995, now abandoned.

(51) Int. Cl.
G06F 15/16 (2006.01)
H04N 7/173 (2006.01)
(52) U.S. Cl. ..................... 709/231; 725/92
(58) Field of Classification Search ........... 709/221, 709/223, 250, 231; 725/61, 111, 115, 117, 725/145, 91, 86–89, 92, 105; 705/26, 79
See application file for complete search history.

(56) References Cited

U.S. PATENT DOCUMENTS 3,982,620 A  9/1976 Kortenhaus

| 4,186,438 A | 1/1980 | Benson et al. |
| 4,232,295 A | 11/1980 | McConnell |
| 4,335,809 A | 6/1982 | Wain |
| 4,335,908 A | 6/1982 | Burge |

(Continued)

FOREIGN PATENT DOCUMENTS

AU    199954012    4/2000

(Continued)

OTHER PUBLICATIONS

"High-speed Opens and Shorts Substrate Tester", IBM Technical Disclosure Bulletin, vol. 33, No. 12, May 1991, pp. 251-259.

(Continued)

*Primary Examiner*—William C. Vaughn, Jr.
*Assistant Examiner*—Yemane M. Gerezgiher
(74) *Attorney, Agent, or Firm*—Nixon & Vanderhye P.C.

(57) ABSTRACT

Audiovisual reproduction system triggered by payment from a user, developed around a microprocessor device, said system comprising memory containing, in compressed digital form, audio and visual information to be used, a display and digital audio reproduction unit enabling formation of a multimedia environment, wherein the display comprises a video monitor and an interactive interface with the user by an interface program which reacts to external events and translates the external events for a multitasking operating system as events which trigger, via a graphical module of a library of integrated tools and services, a display of windows or frames providing a modification of physical operating parameters of the audiovisual reproduction system, said external events comprising at least a down event interpreting coincidence of a placement of pointing device with the position of at least a representation displayed by the graphic module, and an event which triggers modification of the physical operating parameters by storing these parameters in said memory.

10 Claims, 7 Drawing Sheets

U.S. PATENT DOCUMENTS

| | | |
|---|---|---|
| 4,412,292 A | 10/1983 | Sedam et al. |
| 4,521,014 A | 6/1985 | Sitrick |
| 4,528,643 A | 7/1985 | Freeny, Jr. |
| 4,558,413 A | 12/1985 | Schmidt |
| 4,572,509 A | 2/1986 | Sitrick |
| 4,582,324 A | 4/1986 | Koza et al. |
| 4,593,904 A | 6/1986 | Graves |
| 4,597,058 A | 6/1986 | Izumi et al. |
| 4,636,951 A | 1/1987 | Harlick |
| 4,652,998 A | 3/1987 | Koza et al. |
| 4,654,799 A | 3/1987 | Ogaki et al. |
| 4,658,093 A | 4/1987 | Hellman |
| 4,667,802 A | 5/1987 | Verduin et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,722,053 A | 1/1988 | Dubno |
| 4,761,684 A | 8/1988 | Clark et al. |
| 4,766,581 A | 8/1988 | Korn et al. |
| 4,787,050 A | 11/1988 | Suzuki |
| 4,792,849 A | 12/1988 | McCalley |
| 4,811,325 A | 3/1989 | Sharples, Jr. et al. |
| 4,825,054 A | 4/1989 | Rust |
| 4,829,570 A | 5/1989 | Schotz |
| 4,868,832 A | 9/1989 | Marrington |
| 4,920,432 A | 4/1990 | Eggers |
| 4,922,420 A | 5/1990 | Nakagawa et al. |
| 4,926,485 A | 5/1990 | Yamashita |
| 4,937,807 A | 6/1990 | Weitz et al. |
| 4,949,187 A | 8/1990 | Cohen |
| 4,956,768 A | 9/1990 | Sidi et al. |
| 4,958,835 A | 9/1990 | Tashiro et al. |
| 4,999,806 A | 3/1991 | Chernow |
| 5,012,121 A | 4/1991 | Hammond |
| 5,041,921 A | 8/1991 | Scheffler |
| 5,058,089 A | 10/1991 | Yoshimaru et al. |
| 5,155,847 A | 10/1992 | Kirouac |
| 5,163,131 A | 11/1992 | Row |
| 5,166,886 A | 11/1992 | Molnar |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,262,875 A | 11/1993 | Mincer |
| 5,276,866 A | 1/1994 | Paolini |
| 5,315,161 A | 5/1994 | Robinson |
| 5,339,413 A | 8/1994 | Koval et al. |
| 5,341,350 A | 8/1994 | Frank et al. |
| 5,355,302 A | 10/1994 | Martin et al. |
| 5,369,778 A | 11/1994 | SanSoucie |
| 5,375,206 A | 12/1994 | Hunter et al. |
| 5,418,713 A | 5/1995 | Allen |
| 5,420,923 A | 5/1995 | Beyers |
| 5,428,252 A | 6/1995 | Walker |
| 5,431,492 A | 7/1995 | Rothschild |
| 5,445,295 A | 8/1995 | Brown |
| 5,455,926 A | 10/1995 | Keele |
| 5,457,305 A | 10/1995 | Akel et al. |
| 5,465,213 A | 11/1995 | Ross |
| 5,481,509 A | 1/1996 | Knowles |
| 5,489,103 A * | 2/1996 | Okamoto ................ 463/29 |
| 5,495,610 A | 2/1996 | Shing |
| 5,499,921 A | 3/1996 | Sone |
| 5,511,000 A | 4/1996 | Kaloi |
| 5,513,117 A | 4/1996 | Small |
| 5,519,435 A | 5/1996 | Anderson |
| 5,548,729 A | 8/1996 | Akiyoshi |
| 5,550,577 A | 8/1996 | Verbiest |
| 5,555,244 A | 9/1996 | Gupta |
| 5,557,541 A | 9/1996 | Schulhof |
| 5,559,549 A | 9/1996 | Hendricks |
| 5,561,709 A | 10/1996 | Remillard |
| 5,566,237 A | 10/1996 | Dobbs |
| 5,570,363 A | 10/1996 | Holm |
| 5,583,561 A | 12/1996 | Baker et al. |
| 5,583,994 A | 12/1996 | Rangan |
| 5,583,995 A * | 12/1996 | Gardner et al. ............ 709/219 |
| 5,592,551 A | 1/1997 | Lett |
| 5,612,581 A | 3/1997 | Kageyama |
| 5,617,565 A * | 4/1997 | Augenbraun et al. .......... 707/4 |
| 5,619,247 A | 4/1997 | Russo |
| 5,619,250 A * | 4/1997 | McClellan et al. ......... 725/132 |
| 5,619,698 A | 4/1997 | Lillich |
| 5,623,666 A | 4/1997 | Pike |
| 5,642,337 A | 6/1997 | Oskay |
| 5,644,714 A | 7/1997 | Kikinis |
| 5,644,766 A | 7/1997 | Coy |
| 5,668,788 A | 9/1997 | Allison |
| 5,697,844 A | 12/1997 | Von Kohorn |
| 5,703,795 A | 12/1997 | Mankowitz |
| 5,708,811 A | 1/1998 | Arendt |
| 5,712,976 A * | 1/1998 | Falcon et al. ............... 725/115 |
| 5,726,909 A | 3/1998 | Krikorian |
| 5,734,719 A | 3/1998 | Tsevdos et al. |
| 5,734,961 A | 3/1998 | Castille |
| 5,751,336 A | 5/1998 | Aggarwal et al. |
| 5,761,655 A | 6/1998 | Hoffman |
| 5,762,552 A | 6/1998 | Vuong |
| 5,774,668 A | 6/1998 | Choquier |
| 5,781,889 A | 7/1998 | Martin et al. |
| 5,790,172 A | 8/1998 | Imanaka |
| 5,790,671 A | 8/1998 | Cooper |
| 5,790,856 A | 8/1998 | Lillich |
| 5,793,980 A | 8/1998 | Glaser |
| 5,798,785 A | 8/1998 | Hendricks |
| 5,802,599 A | 9/1998 | Cabrera |
| 5,808,224 A | 9/1998 | Kato |
| 5,809,246 A | 9/1998 | Goldman |
| 5,815,146 A | 9/1998 | Youden et al. |
| 5,832,287 A * | 11/1998 | Atalla ....................... 709/249 |
| 5,835,843 A | 11/1998 | Haddad |
| 5,845,104 A | 12/1998 | Rao |
| 5,848,398 A | 12/1998 | Martin |
| 5,854,887 A | 12/1998 | Kindell |
| 5,862,324 A | 1/1999 | Collins |
| 5,864,870 A | 1/1999 | Guck |
| 5,867,714 A | 2/1999 | Todd |
| 5,884,028 A | 3/1999 | Kindell et al. |
| 5,884,298 A | 3/1999 | Smith |
| 5,887,193 A | 3/1999 | Takahashi et al. |
| 5,913,040 A | 6/1999 | Rakavy |
| 5,915,094 A | 6/1999 | Kouloheris et al. |
| 5,915,238 A | 6/1999 | Tjaden |
| 5,917,537 A | 6/1999 | Lightfoot |
| 5,917,835 A | 6/1999 | Barrett |
| 5,920,702 A | 7/1999 | Bleidt et al. |
| 5,923,885 A | 7/1999 | Johnson |
| 5,930,765 A | 7/1999 | Martin |
| 5,931,908 A | 8/1999 | Gerba |
| 5,949,688 A | 9/1999 | Montoya |
| 5,959,869 A | 9/1999 | Miller |
| 5,959,945 A | 9/1999 | Kleiman |
| 5,966,495 A | 10/1999 | Takahashi |
| 5,978,855 A * | 11/1999 | Metz et al. ................ 709/249 |
| 6,002,720 A | 12/1999 | Yurt |
| 6,005,599 A * | 12/1999 | Asai et al. ................... 725/116 |
| 6,009,274 A | 12/1999 | Fletcher |

| | | | |
|---|---|---|---|
| 6,018,337 A | 1/2000 | Peters | |
| 6,018,726 A | 1/2000 | Tsumura | |
| 6,041,354 A * | 3/2000 | Biliris et al. | 709/226 |
| 6,072,982 A | 6/2000 | Haddad | |
| 6,151,634 A | 11/2000 | Glaser | |
| 6,308,204 B1 * | 10/2001 | Nathan et al. | 709/221 |
| 6,488,508 B1 * | 12/2002 | Okamoto | 434/307 A |
| 6,702,585 B1 * | 3/2004 | Okamoto | 434/307 A |

FOREIGN PATENT DOCUMENTS

| | | |
|---|---|---|
| EP | 0 309 298 | 3/1989 |
| GB | A 2122799 | 1/1984 |
| GB | 2166328 A | 4/1986 |
| GB | 2170943 | 8/1986 |
| GB | 2193420 | 2/1988 |
| GB | A 2193420 | 2/1988 |
| GB | 2 238680 A | 6/1991 |
| GB | 2259398 | 3/1993 |
| GB | A2259398 | 3/1993 |
| GB | 2262170 A | 6/1993 |
| JP | 57-173207 | 10/1982 |
| JP | 58-179892 | 10/1983 |
| JP | 60-253082 | 12/1985 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 10/1993 |
| JP | 07281682 | 10/1995 |
| JP | 08-279235 | 10/1996 |
| JP | 10-098344 | 4/1998 |
| WO | WO 86 01326 A | 2/1986 |
| WO | A9007843 | 7/1990 |
| WO | WO 91/08542 | 6/1991 |
| WO | A 9120082 | 12/1991 |
| WO | WO 93/16557 | 8/1993 |
| WO | A 9318465 | 9/1993 |
| WO | A94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12256 | 4/1996 |
| WO | WO 96/12257 | 4/1996 |
| WO | WO 96 12258 A | 4/1996 |
| WO | WO 98/45835 | 10/1998 |
| WO | WO 01/00290 | 1/2001 |

OTHER PUBLICATIONS

"Darts Revolution Again", Replay Magazine, Mar. 1991, pp. 146-148.

Bonczck, Robert H. et al, "The DSS Development System", 1983 National Computer Conference, Anaheim, California, May 16-19, 1983, pp. 441-455.

IBM Technical Disclosure Bulletin, vol. 30, No. 5, Oct. 1987, "Method for Automated Assembly of Software Versions", pp. 353-355.

"Robotic Wafer Handling System for Class 10 Environments" IBM Technical Disclosure Bulletin, vol. 32, No. 9A, Feb. 1990, pp. 141-143.

Galen A. Grimes, "Chapter 18, Taking Advantage or Web-based Audio."

Petri Koskelainem "Report on Streamworks™".

W. Richard Stevens, "TCP/IP Illustrated: vol. 1, the Protocols".

Nowell Outlaw "Virtual Servers Offer Performance benefits for Networks Imaging".

* cited by examiner

AUDIOVISUAL DISTRIBUTION SYSTEM FOR PLAYING AN AUDIOVISUAL PIECE AMONG A PLURALITY OF AUDIOVISUAL DEVICES CONNECTED TO A CENTRAL SERVER THROUGH A NETWORK

This application is a Continuation of application Ser. No. 08/817,426, filled on Jun. 19, 1997 now abandoned, which is a 371 of PCT/FR95/01337 filled on Oct. 12, 1995.

CROSS-REFERENCE TO RELATED APPLICATIONS

This application is related to our co-pending commonly assigned applications:

| | |
|---|---|
| USSN 08/817,690 | (Corres. to PCT/FR94/01185 filed Oct. 12, 1994); |
| USSN 08/817,689 | (Corres. to PCT/FR95/01333 filed Oct. 12, 1995); |
| PAT. NO. 6,308,204 | (Corres. to PCT/FR95/01334 filed Oct. 12, 1995 |
| USSN 08/817,968 | (Corres. to PCT/FR95/01335 filed Oct. 12, 1995) |
| PAT. NO. 6,182,126 | (Corres. to PCT/FR95/01336 filed Oct. 12, 1995) |
| USSN 08/817,438 | (Corres. to PCT/FR95/01338 filed Oct. 12, 1995) |

BACKGROUND AND SUMMARY OF THE INVENTION

1. Field of the Invention

This invention relates to an audiovisual distribution system for playing an audiovisual piece on at least one audiovisual device from among a plurality of audiovisual devices linked in a network to a central server.

2. Description of Related Art

Networks exist which make it possible to produce music from a jukebox-type device by frequency multiplexing a musical selection on a cable network of the coaxial cable type used to distribute television channels. A device such as this one is known from patent EP 0140593. This patent has the drawback, however, that it requires conversion boxes to demultinaex signals, and it uses a network of the coaxial type involving—for one channel—distribution of the same selection to all stations.

A first object of the invention is to allow the network to distribute as a matter of choice either the same selection to all the devices, or a different selection to each individual device; the selection can be either of the audio or video type.

British patent 2193420 and patent PCT WO 9415416 also disclose audio selection distribution networks requiring telephone lines. Due to the use of these telephone lines, network transmission speeds are limited and a network such as this cannot be used for distribution of video selections requiring a high transmission speed to allow good-quality video reproduction.

PCT patent WO 9415416 discloses use of a telephone line of the ISDN type, but even this type of line—the transmission speed of which is limited to 18 megabits per second—is not sufficient to distribute good-quality video data to a sufficient number of devices.

Finally, another object of the invention is a network in which the costly elements are transferred to the level of the server to reduce the cost of each audiovisual reproduction device, but without detriment to their performance. These costly elements are high-capacity hard disks allowing storage of a sufficient number of data selections, in particular video, and also telecommunication modems with transmission speeds allowing the network to be linked to a central system servicing a plurality of networks.

This object is achieved in an audiovisual distribution system according to the present invention. An audiovisual piece can be played on at least one audiovisual device from among a plurality of audiovisual devices. Each device includes audio or video units for playing a piece. The audio or video units are linked to a central computer server containing optical or magnetic memory for mass storage of a plurality of audiovisual pieces selectable from any of these devices. Each of the audiovisual devices has interactive structure for communication with the user to select a piece or a menu, a payment device, a computer network card, a permanent semiconductor memory containing a multitask operating system including at least one hard disk access management task in which the order to play a piece resulting from a selection is handled as a hard disk sequential access task and declaration of the hard disk as a peripheral corresponding to the network card of the device, in order to allow a request to a server to be sent through the network for processing. The server includes a multitask operating system, a permanent mass memory of the magnetic or optical type, and a network card by which the requests from different devices are received. The operating system processes these disk access requests produced by the devices as actual disk access requests.

Another feature of the invention is that in the operating system of each audiovisual device, the declaration of the telecommunications modem belonging to a telecommunications access task as peripheral corresponds to that of the network card, and when a telecommunications access request is made at the device level, the network card of this device transmits this request to the server which itself has at least one telecommunications modem.

According to another feature, the audiovisual device is assured beforehand by a request that the modem card of the server be available.

According to another feature, the transmission speed of each network card and the buffers of video and audio control circuits are dimensioned to allow exchange of data with a transmission rate sufficient for video animation on a network containing at least eight audiovisual devices.

According to another feature, each audiovisual device has a touch screen and its interface software connected as an interactive means of communication with the user.

According to another feature, the network has as many servers each linked to a hard disk as it does servers corresponding to the number (multiple of eight) of audiovisual devices.

According to another feature, the operating system of each server is linked to a switching device making it possible to decide whether the data supplied in response to the request of one network device are given to all the network devices or only to those devices which transmitted a request.

According to another feature, the server is equipped with structure for audio or video performance of a piece, a payment device, and structure for interactive communication with a user or network manager.

BRIEF DESCRIPTION OF THE DRAWINGS

Other advantages and features of the invention will be discussed in the description below, with reference to the attached drawings, given by way of an illustrative example but not limited to one embodiment of the invention, in which.

DETAILED DESCRIPTION OF PREFERRED EMBODIMENTS

Figure 1:
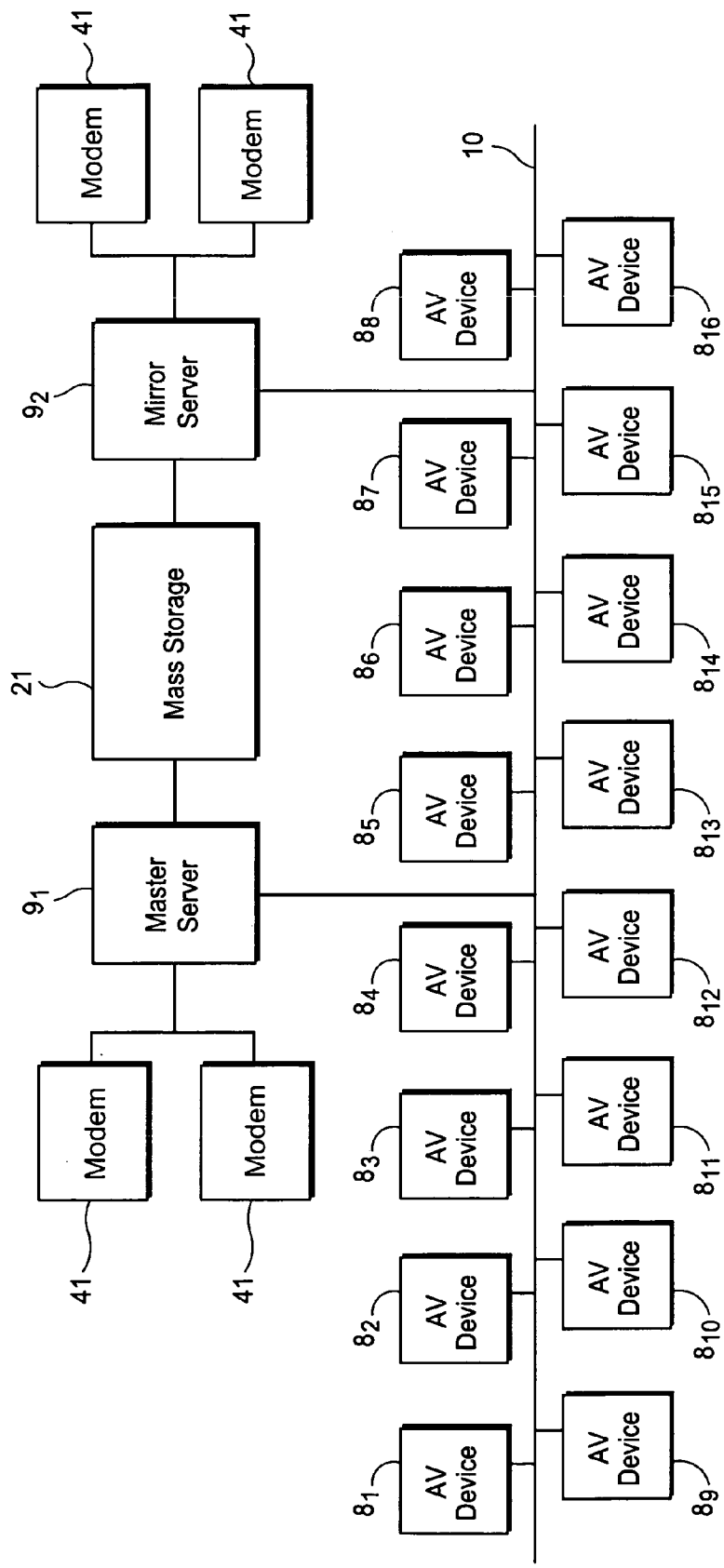
FIG. 1 shows a circuit diagram of the network according to the invention.

Preferably, but in a nonrestrictive manner, the audiovisual reproduction system uses the components cited above and numbered hereafter as in FIG. 1.

The system is comprised of a plurality of audiovisual devices AV ($8_1$, $8_2$, $8_i$, $8_{16}$) linked to one another and via a computer server to at least one server ($9_1$, $9_2$).

There are two types of servers ($9_1$, $9_2$) which can be linked to a local network (10), master servers ($9_1$) and mirror servers ($9_2$). Master servers ($9_1$) are those which are actively involved with the local network. They are the ones which receive requests from the jukeboxes (8) and which do the work.

The job of the mirror servers ($9_2$) is to clone the master servers ($9_1$). They must be perfectly synchronized with their masters to be ready for any change. When they detect that the master server ($9_1$) is no longer responding to the requests of the jukeboxes (8), they must make distress calls to the network administrators in order to take over for the masters until the latter are operating normally again.

Figure 3:
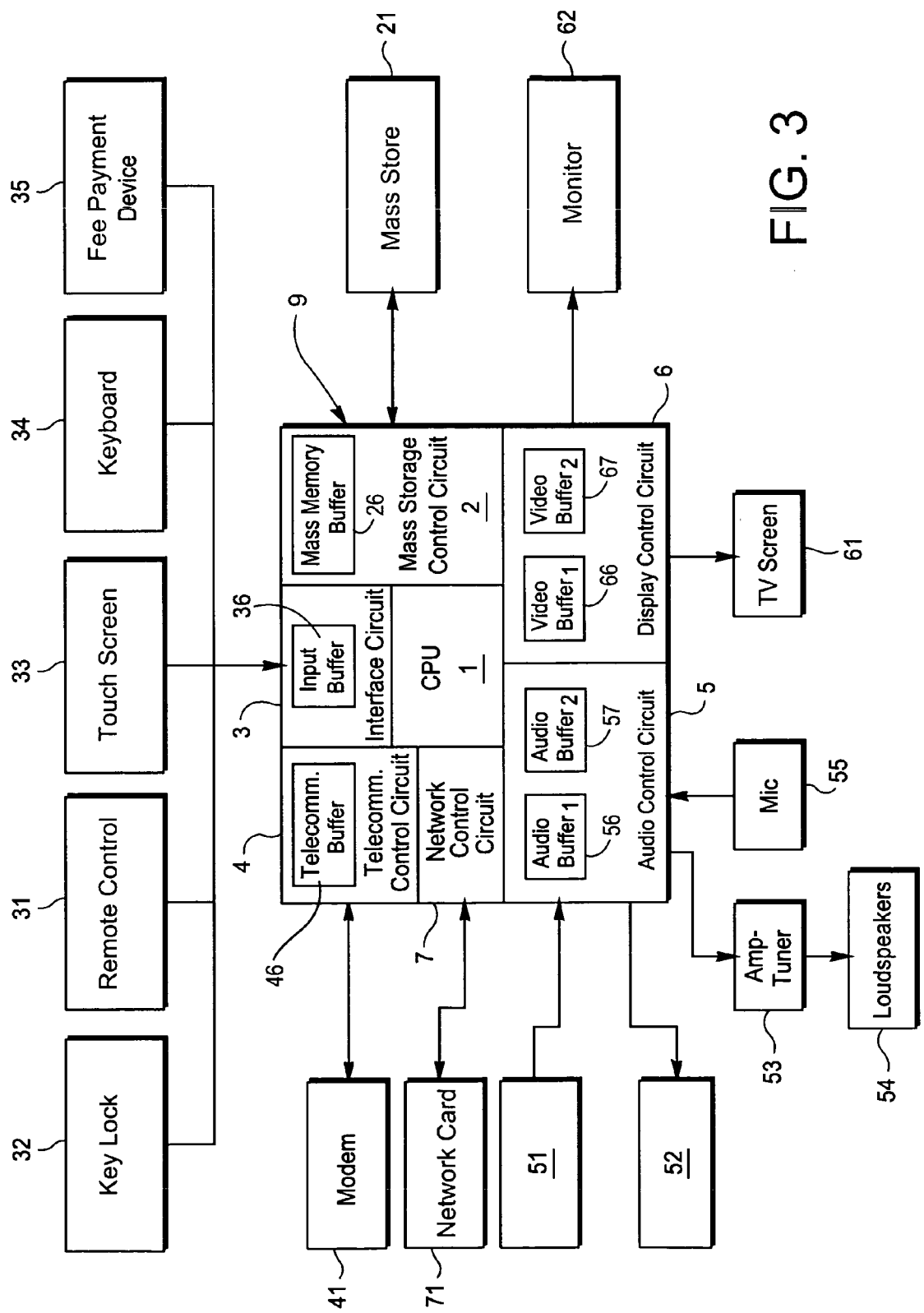
FIG. 3 shows a schematic of the circuits which comprise a server of the network.

Each server ($9_1$, $9_2$) is comprised of a central microprocessor (1 in FIG. 3) which is, for example, a high-performance PC-compatible system, the choice for the embodiment having fallen on an Intel 80486 DX/2 system which has storage means and the following characteristics.

compatibility with the local Vesa bus,
processor cache memory: 256 kO,
100 Mbit network card (71)
high performance parallel and serial ports,
32-bit type SCSI/2WIDE bus controller,
32 MO battery backedup static RAM.

The operating system of the network cards must be a local network server such as NOVELL, OS/2 LAN SERVER, UNIX or any other similar operating system.

This network server software allows access, exchange and sharing of data and equipment resources in an orderly manner by applying priorities and rules of access to each of the customers connected to the local network.

Any other central processor with equivalent or better performance can be used in the invention.

The central unit (1, FIG. 3) of the server controls and manages network control circuit (7), telecommunications control circuit (4), input control or interface circuit (3), and mass storage control circuit (2). If server (9) must operate as a jukebox, it is possible to add audio control circuit (5) and display control circuit (6) of the same type as of devices (8). The display consists essentially of 14 inch (35.56 cm) flat screen video monitor (62) without interleaving of the SVGA type, with high resolution and low radiation, which is used for image reproduction (for example, the covers of the albums of the musical selections), graphics or video clips.

For maintenance, server (9) uses external keyboard (34) which can be linked to the server which has for that purpose a keyboard connector, controlled by interface circuit (3).

Mass storage means (21) using high-speed, high-capacity SCSI-type hard disks are connected to the storage means already present in the microprocessor of server (9). These means are used to store digitized and compressed audiovisual data.

High-speed telecommunications modem circuit (41) of at least 28.8 Kbps is incorporated into server (9) to authorize the link to a network for distribution of audiovisual data controlled by a central system covering several servers.

Figure 2:
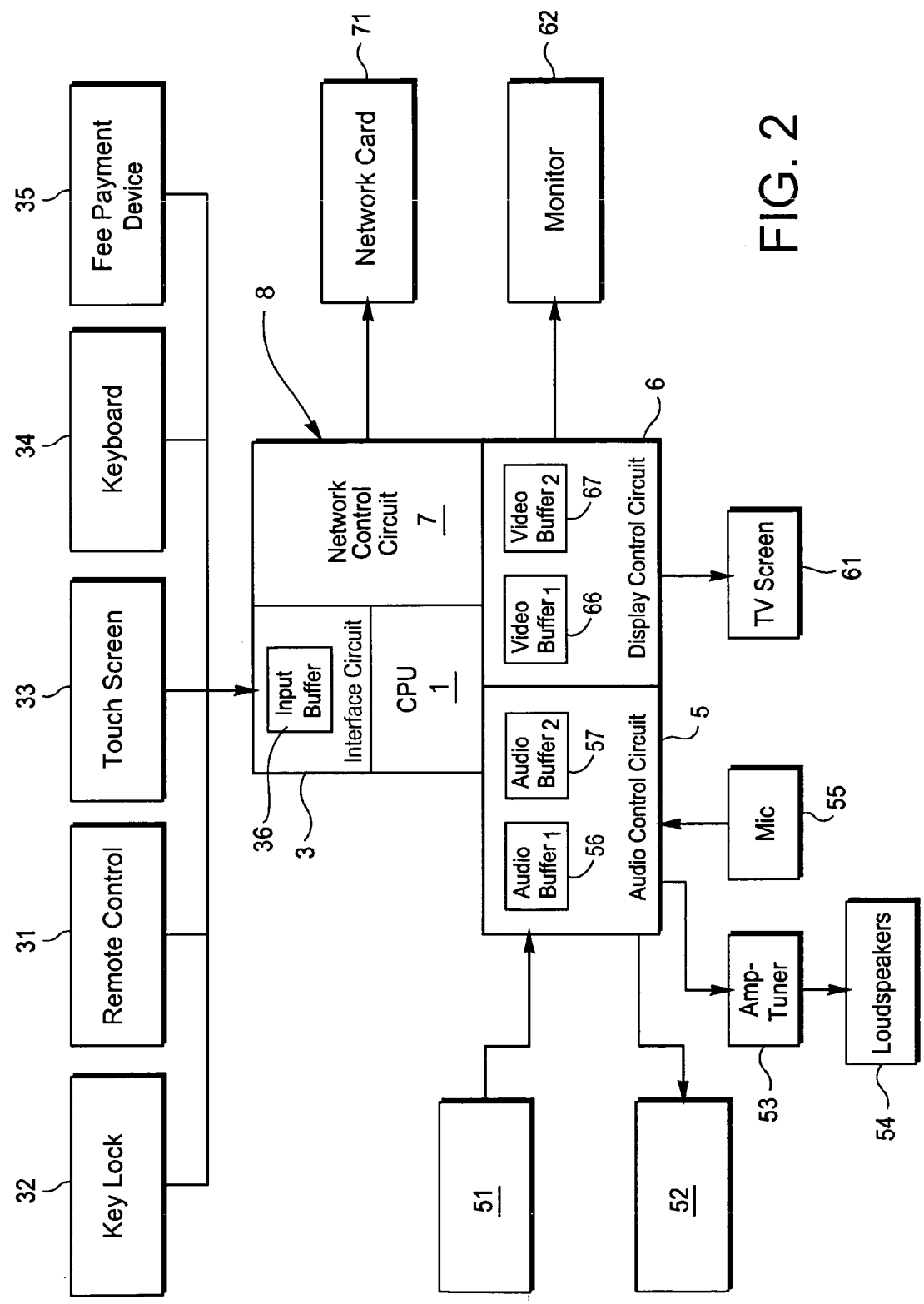
FIG. 2 shows a schematic of the circuits which comprise an audiovisual device of the network.

Each audiovisual device (8) has one central microprocessor unit (1, FIG. 2) which is, for example, a high-performance PC-compatible system. The choice for the embodiment has fallen on an Intel 80486 DX/2 system which has storage means and the following characteristics:

compatibility with the local Vesa bus,
processor cache memory: 256 kO,
100 Mbit network card (71),
32 MO battery-backed static RAM,
high performance parallel and serial ports.

Any other central processor with equivalent or better performance can be used in the invention.

This central unit controls and manages audio control circuit (5), input control circuit (3), computer network control circuit (7) and display control circuit (6). The display consists essentially of a 14 or 15 inch (35.56 cm) flat screen video monitor (62) without interleaving of the SVGA type, with high resolution and low radiation, which is used for image reproduction (for example, the covers of the albums of the musical selections), graphics or video clips.

To reproduce the audio data of musical selections, the devices and possibly the server(s) have loudspeakers (54) which receive the signal of an amplifier-tuner (53) linked to electronic circuit (5) of the music synthesizer type intended to support a large number of input sources while providing one output with CD (compact disk)-type quality, such as for example the microprocessor multimedia audio adapter of the "Sound Blaster" card type SBP32AWE by Creative Labs Inc to which two memory buffers (56, 57) are added for the purpose described below. This circuit (5) has the function of decompressing the digital data arriving via the network.

Likewise the display control circuit also has two buffer memories (66, 67) for the purpose described below.

A ventilated, thermally controlled power supply of 240 watts powers each device or server. This power supply is protected from surges and harmonics.

Each audiovisual device (8) and possibly the server(s) (9) manage—via input controller circuit (3)—an "Intelli Touch" 14-inch (35.56 cm) touch screen (33) from Elo Touch Systems Inc. which includes a glass coated board using "advanced surface wave technology" and an AT type bus controller. This touch screen allows, after having displayed on video monitor (62) or television screen (61) various selection data used by the customers, as well as management command and control information used by the system manager or owner. It is likewise used on each device (8) for maintenance purposes in combination with external keyboard (34) which can be connected to the device which has a keyboard connector for this purpose, controlled by key lock (32) via interface circuit (3).

Input circuit (3) of at least one of devices (8) of the network likewise interfaces with a remote control set (31) composed for example of:

an infrared remote control from Mind Path Technologies Inc., including an emitter which has 15 control keys for the microprocessor system and 8 control keys for the projection device.

an infrared receiver with serial adapter from Mind Path Technologies Inc.

A fee payment device (35) from National Rejectors Inc. is likewise connected to input interface circuit (3). It is also possible to use any other device which allows receipt of any type of payment by coins, bills, tokens, magnetic chip cards or a combination of means of payment.

To house the circuits, each device has a chassis or frame of steel with external customizable fittings.

Besides these components, a wireless or wired microphone (55) is connected to audio controller (5) of each device; this allows transformation of the latter into a powerful public address system or possibly a karaoke machine. Likewise a wireless loudspeaker system can be used by the system.

Remote control set (31) allows the manager, for example from behind the bar, to access and control various commands such as:

microphone start/stop command,
loudspeaker muting command,
audio volume control command;
command to cancel the musical selection being played.

Two buffers (56, 57) are connected to audio controller circuit (5) to allow storage of information corresponding to a quarter of a second of sound each in alternation. Likewise two buffers (66, 67) are linked to each video controller circuit (6), each of which is able to store a tenth of a second of video in alternation. Finally, an input interface buffer (36) is connected to each input interface (3) of each device (8) or server (9).

The system operating software of each device (8) or server (9) was developed around a library of tools and services largely oriented to the audiovisual domain in a multimedia environment. This library advantageously includes a powerful multitask operating system which effectively authorizes simultaneous execution of multiple fragments of code. This operating software thus allows concurrent execution—in an orderly manner and avoiding any conflict—of operations carried out on the display or audio reproduction structure as well as management of the telecommunications lines via the distribution network. In addition, the software has high flexibility.

The digitized and compressed audiovisual data are stored in storage (21) of server (9).

Each selection is available in two digitized formats: with hi-fi quality or CD quality.

The operating software of each device (8) is installed in the battery backed-up static RAM of each device (8), while the operating software of server (9) can be backed up on hard disk (21) and loaded for operation in the server's RAM.

It must be noted that the specific tasks of the modules which make up the operating system are executed simultaneously in an environment using the multitask operating system. Consequently, the organizational chart indicates specific operations which a module must perform and not a branch to this module which would invalidate all the operations performed by the other modules.

The first module, labeled SSM, is the startup module. This module does only one thing, and consequently it is loaded automatically when the device or server is powered up and then directly re-enters the "in service" mode of the module labeled RMM.

The RMM module is the module of the "in service" mode which is the mode of operation which the system enters when its registration number has been validated. In this mode, device (8) or server (9) is ready to handle any request which can be triggered by various predefined events such as:

users touching the screen of device (8), transferring foreground session control to the CBSM module from the customer browsing and selection mode, telecommunications call requests by the TSM telecommunications services module, Device (8) or server (9) remains in the "in service" mode until one of the events cited above takes place.

The CBSM module is the customer browsing and selection mode. Access to this module is triggered from the "in service" mode when the customer touches the screen. The display allows the user to view a menu provided for powerful browsing assisted by digitized voice messages to guide the user in his choice of musical selections.

The TSM module is the telecommunications services mode module between the network server and a central system covering several servers belonging to different networks. The module allows management of all management services available on the distribution network. All the tasks specific to telecommunications are managed as background tasks of the system. These tasks always use only parts of the processing time remaining once the system has completed all its foreground tasks. Thus, when the system is busy with one of its higher priority tasks, the telecommunications tasks automatically will try to reduce the limitations on system resources and recover all the microprocessor processing time left available.

The SPMM module allows management of musical, song or video selections queued by the system for execution in the order of selection.

The multitask operating system is the essential component for allowing simultaneous execution of multiple code fragments and for managing priorities between the various tasks which arise.

Figure 4:
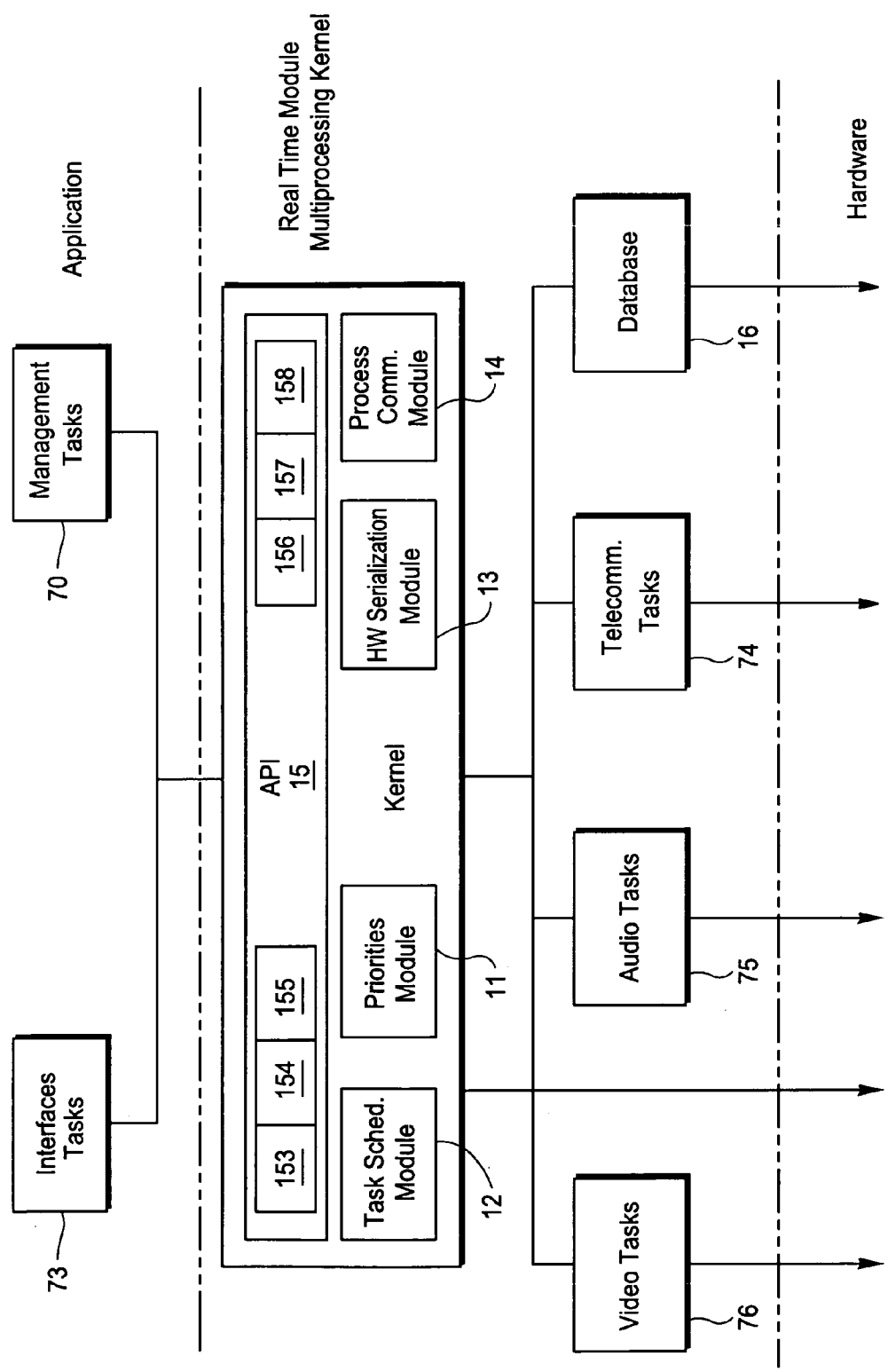
FIG. 4 shows the organization of the multitask system which manages the hardware and software structure of each of the devices or servers of the network.

This multitask operating system is organized as shown in FIG. 4 around a kernel comprising a module (11) for resolving priorities between tasks, task scheduling module (12), module (13) for serialization of hardware used, and process communications module (14). Each of the modules communicates with applications programming interfaces (15) and database (16). There are as many programming interfaces as there are applications. Thus, module (15) includes first programming interface (153) for touch screen (33), second programming interface (154) for the keyboard, third programming interface (155) for payment device (35), fourth programming interface (156) for audio control circuit (5), fifth programming interface (157) for video control circuit (6) and last interface (158) for computer network control circuit (7).

It should be noted that the programming interface of the network card is supplied with the card when a network kit is purchased and that the network card is declared to the operating system as the peripheral comprising the hard disk or the modem, telecommunication card of each audiovisual device (8). Thus each operating system of each device (8), after calling a telecommunications procedure or hard disk access procedure following a selection, triggers a network communication session in which the network card of the server will make the called resource available to each audiovisual device (8).

Five tasks with a decreasing order of priority are managed by the kernel of the operating system, the first (76) for the video inputs/outputs has the highest priority, the second (75) of level two relates to audio, the third (74) of level three to telecommunications, the fourth (73) of level four to interfaces and the fifth (70) of level five to management. These orders of priority will be considered by priority resolution module (11) as and when a task appears and disappears. Thus, as soon as a video task appears, the other tasks underway are suspended, priority is given to this task and all the resources are assigned to the video task. At the output, video task (76) is designed to unload the video files from mass memory (21) alternatively to one of two buffers (66, 67) of device (8) which made the request, whereas the other buffer (67 or 66) is used by video controller circuit (6) of device (8) having made the request to produce the display after data decompression. At the input, video task (76) from server (9) is designed to transfer data received in telecommunications buffer (46) of server (9) to mass storage (21) of server (9). It is the same for audio task (75) on the one hand at the input between a telecommunications buffer (46) and the buffer (26) of mass memory (21) and on the other hand at the output between a buffer (26) of mass memory (21) of server (9) and one of two buffers (56, 57) of audio controller circuit (5) of device (8) which made the request.

Figure 5:
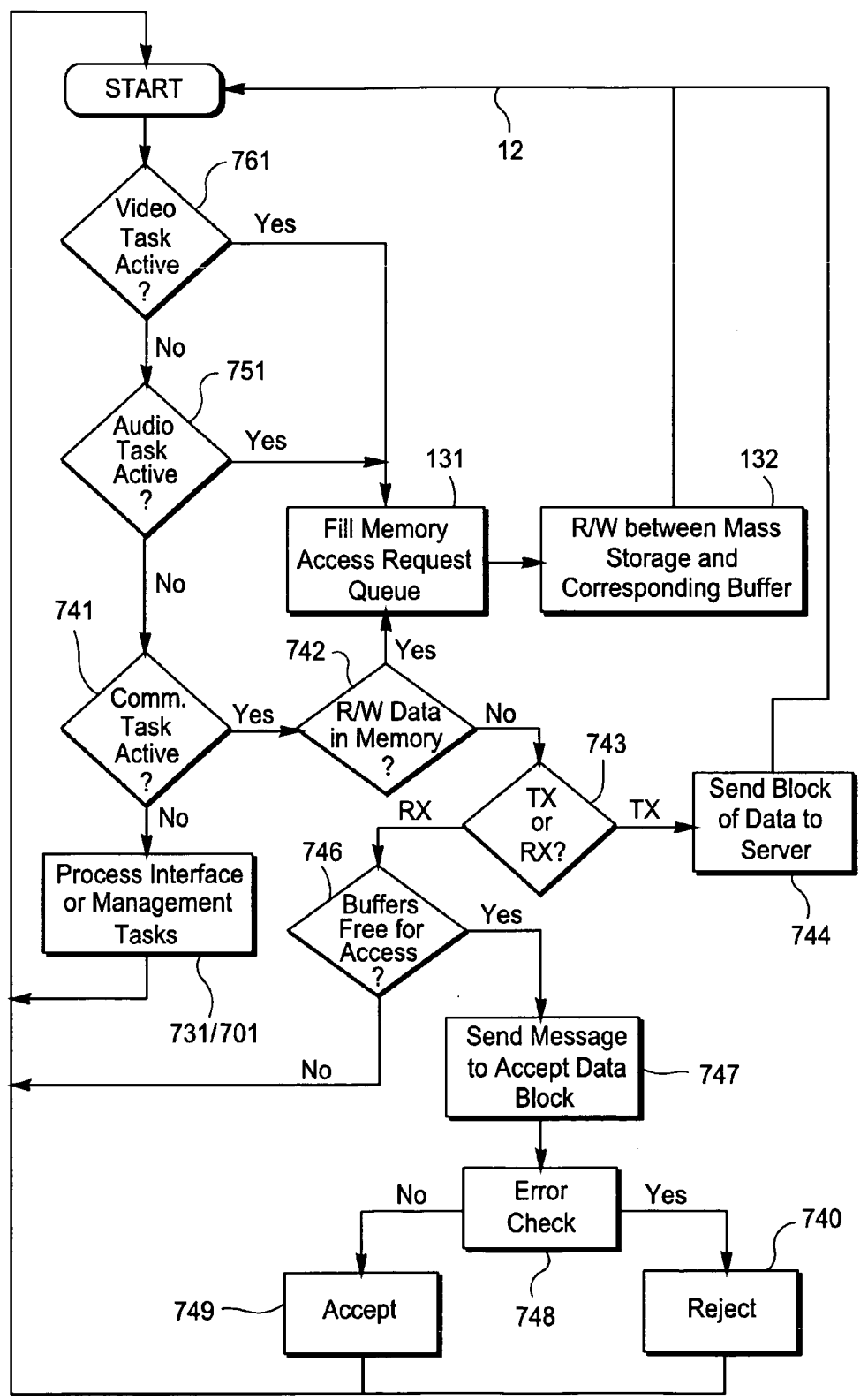
FIG. 5 shows a flowchart which describes how the multitask operating system functions.

Task scheduling module (12) of each device (8) or server (9) will now be described in conjunction with FIG. 5. In the order of priority this module performs first test (761) to determine if the video task is active, i.e, if one of video buffers (66, 67) is empty. In the case of a negative response the task scheduling module passes to the following test which is second test (751) to determine if the audio task is active, i.e, if one of buffers (56, 57) is empty. In the case of a negative response, a third test (741) determines if the communication task is active, i.e., if buffer (46) is empty. After a positive response to one of the tests, task scheduling module (12) at stage (131) fills memory access request queue (13) and at stage (132) executes this request by reading or writing between mass storage (21) of server (9) and the buffer corresponding to the active task of device (8), then loops back to the first test. When test (741) on communications activity is affirmative, scheduler (12) performs test (742) to determine if it is a matter of reading or writing data in the memory. If yes, the read or write request is placed in a queue at stage (131). In the opposite case, the scheduler determines at stage (743) if it is transmission or reception and in the case of transmission sends via a network communication procedure at step (744) a block of data to server (9) for transmission by the latter to the central system covering several servers. In the case of reception the scheduler verifies at stage (746) that the server buffers are free for access and in the affirmative sends a message to the central server to accept reception of a data block at stage (747). After receiving a block, an error check (748) of the cyclic redundancy check (CRC) type is executed. The block is rejected at stage (740) in case of error, or accepted in the opposite case at stage (749) by sending a message corresponding to the central system indicating that the block bearing a specific number is rejected or accepted, then loops back to the start tests. When there is no higher level task active, at stage (731 or 701) the scheduler processes interface or management tasks.

Figure 6:
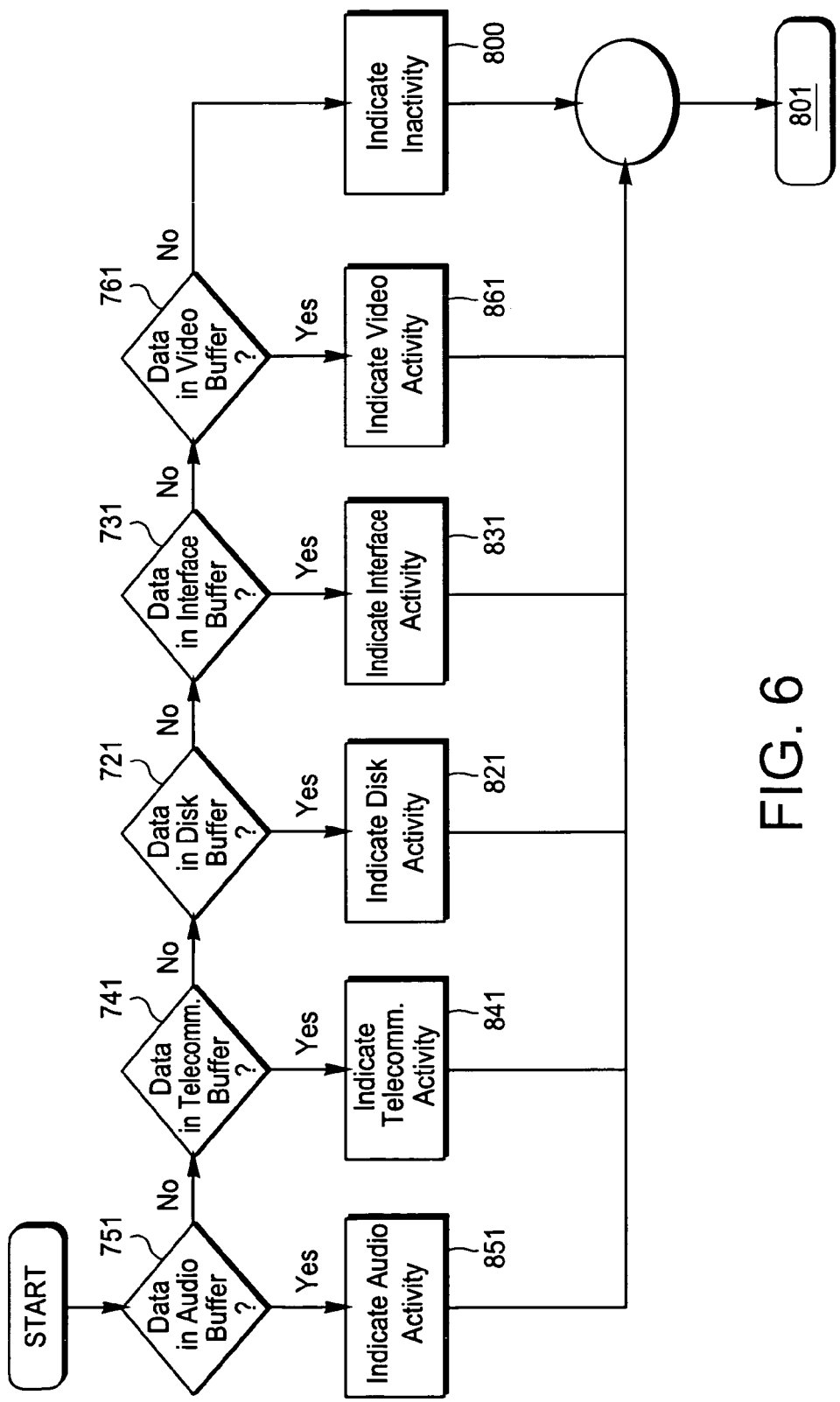
FIG. 6 shows a flowchart which describes how the activities of tasks in the multitask system are verified.

Detection of an active task or ready task is done as shown in FIG. 6 by a test respectively (721 to 761) on each of respective hardware or software buffers (26) of the hard disk, (36) of the interface, (46) of telecommunications, (56 and 57) of audio, (66 and 67) of video which are linked to each of respective controller circuits (2, 3, 4, 5, 6, 7) of each of the hardware devices linked to central processor (1).

Test (721) makes it possible to see whether the data are present in the input and output memory buffer of the disk, test (731) makes it possible to see whether data are present in the hardware or software memory buffers of the customer interface device, test (741) makes it possible to see whether data are present in the software or hardware memory buffers of the telecommunications device, test (751) makes it possible to determine whether data are present in the hardware or software memory buffer for direction, and test (761) makes it possible to see whether data are present in the hardware or software memory buffers of the video device.

If one or more of these buffers are filled with data, scheduler (12) positions respective status buffer or buffers (821) for the hard disk, (831) for the interface, (841) for telecommunications, (851) for audio, (861) for video corresponding to the material in a logic state indicative of the activity. In the opposite case the scheduler status buffers are returned at stage (800) to a value indicative of inactivity.

The operating status of server (9) or respectively of device (8) is kept on hard disk (21) of server (9) or respectively in the battery backed-up memory of device (8).

Each time a notable event occurs, the system immediately registers it in the permanent storage.

Thus, in the case in which an electrical fault or hardware failure occurs, the system will accordingly restart exactly at the same location where it had been interrupted.

Events which trigger back-up of the operating status are:
insertion of money (crediting);
addition of a selection to the queue;
end of a selection (change from the selection currently being played).

The file is then in a machine format which can only be read by the unit and does not occupy more than 64 octets.

Figure 7:
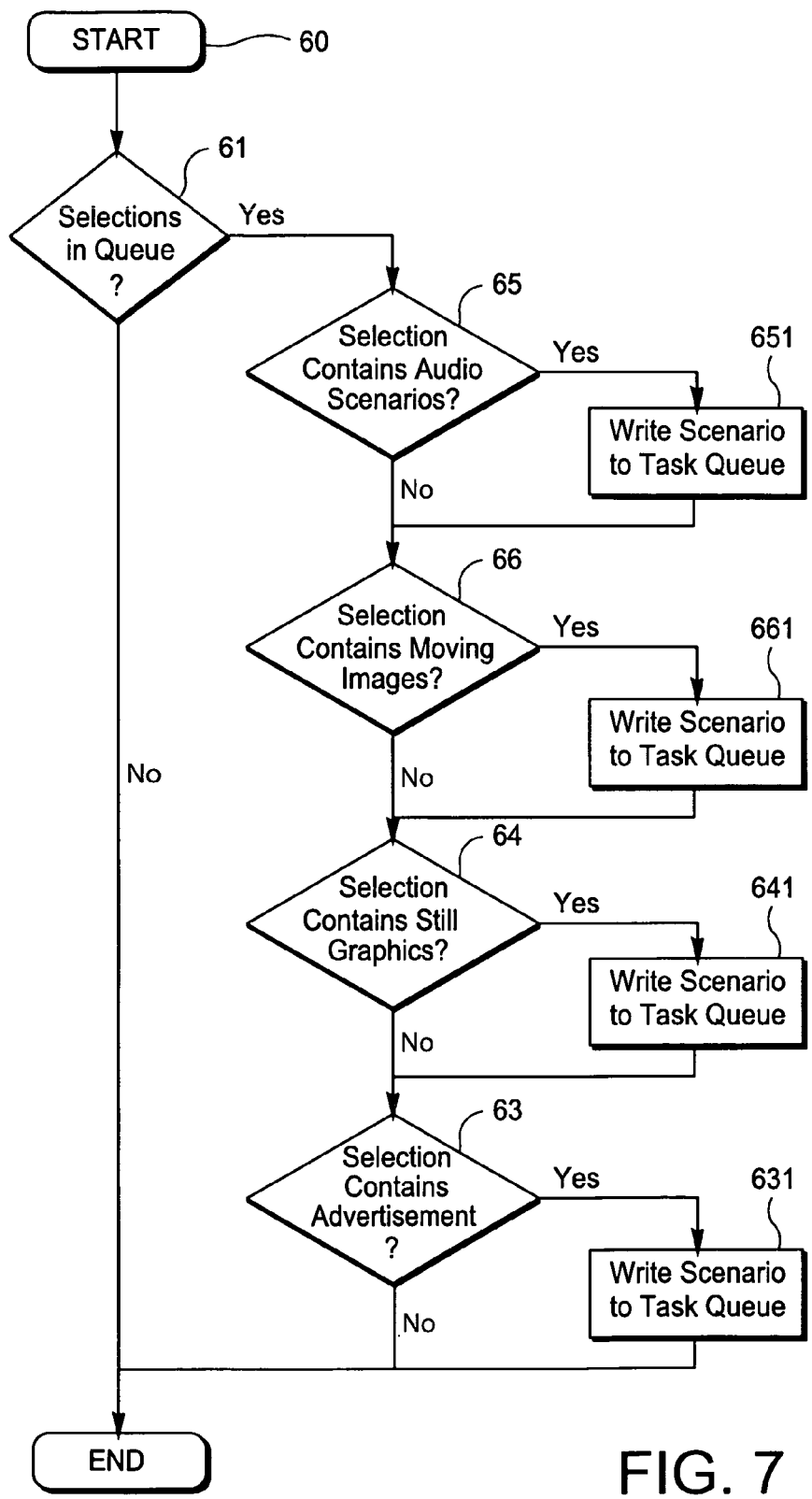
FIG. 7 is a flowchart which describes task queuing.

The number and type of active tasks are indicated to scheduler (12) by execution of the selection management module SPMM whose flowchart is shown in FIG. 7. The management exercised by this module begins with test (61) to determine if selections are in the queue.

Consequently, if test (61) on the queue determines that selections are waiting, when a customer chooses a title he wishes to hear, it is automatically written in a queue file of the system on hard disk.

Thus, any selection made will never be lost in case of an electrical failure. The system plays (reproduces) the selection in its entirety before removing it from the queue file.

When the selection has been reproduced in its entirety, it is removed from the queue file and written in the system statistics file with the date and time of purchase as well as the date and time at which it was played.

Immediately after transfer of the completed selection to the statistics file, the device checks if there are others in the queue file. If there is another, the device begins immediately to play the selection.

Processing continues with test (65) conducted to determine if the selection contains an audio scenario. If yes, at stage (651) this scenario is written in the task queue of scheduler (12). If not, or after this entry, processing is continued by test (66) to determine if the selection contains moving images. If yes, the video scenario is written at stage (661) in the task queue of scheduler (12). If no or if yes after this entry, processing is continued by test (64) to determine if the selection contains still graphics. If yes, at stage (641) this graphic presentation scenario is written in the task queue of scheduler (12). If no or if yes after this entry, processing is continued by test (63) to determine if the selection contains an advertising scenario. If yes, at stage (631) the scenario is written in the task queue of scheduler (12). Thus scheduler (12) notified of uncompleted tasks can manage the progression of tasks simultaneously.

Due on the one hand to the task management mode assigning highest orders of priority to video tasks requiring the most resources, on the other hand to the presence of hardware or software buffers assigned to each of the tasks to temporarily store data, the presence of status buffers relating to each task, and communication between each device and a server via the computer network, it is possible to transfer costly resources necessary for certain tasks of devices (8) to single central unit (9) which also has a multitask operating system.

A basic server (9) is designed to service a local network having up to eight customer jukeboxes. With addition of appropriate peripherals, such as supplementary hard disks, one server can serve a maximum of 8 additional jukeboxes. To add more jukeboxes, it is possible to create local network environments which have several servers which share tasks. Thus it is possible to create environments capable of meeting any need.

A completely equipped server has sufficient resources to administer 16 jukeboxes. A server can support up to 7 disks which can contain as many selections as there is available space needed for the type of selection, with the knowledge that an audio selection and its graphic part require 3.4125 Mbits of available disk space, and an audio and video selection requires 39.568 Mbits of available disk space.

In order to circumvent these limitations and meet the needs of establishments such as hotel complexes which sometimes have several hundred rooms, it is possible to use mass storage technologies such as RAID to back up the selections and/or network configurations with multiple servers in order to serve the jukeboxes.

It is also possible to add additional telecommunications peripherals (41) such as modems in order to satisfy the network's additional needs for telecommunications to the outside.

The network allows the server to assume responsibility for carrying out several tasks common to each jukebox in order to avoid redundancy of work, computer operations and equipment.

The local network also serves as an important link between all the jukeboxes by making connections which allow all data common to all the jukeboxes to be kept and made accessible to each of them.

The common data kept on a server are either audio/video selections or statistics of use of the purchases of each jukebox, or statistics on the audio/video selections.

The jukebox or audiovisual device (8) on the one hand has no telecommunications peripherals because the latter are centralized at server (9), but it does make requests to server (9) which processes them as a priority; on the other hand, it does not have the disk space required to store audio/video selections, since the selections are centralized at server (9) so that they may be shared with all the jukeboxes of the local network.

Network jukebox (8) needs very little permanent storage space, since all data will now be centralized, allowing units without hard disks to be produced and thus reducing maintenance by eliminating those parts most likely to break down. In jukebox (8) without a hard disk, a permanent memory region contains the information and an operating program necessary to make connections with the server and start-up the jukebox operating system.

This permanent memory can be in the form of an EEPROM, static memory banks which are backed up by batteries or even cards called HARD CARDS which are static memory banks backed up by batteries with functions allowing the tasks of a hard disk to be cloned.

The operating system of jukebox module (8) is assured of having the resources necessary to do its work. To do this it must manage the status of links with centralized peripherals and if necessary make requests to the server requesting that the appropriate connections be made between the jukebox and the required peripheral. If the resources, for example, telecommunications resources, are not in use by a jukebox, then server (9) will provide exclusive links to the jukebox.

Once the connection has been made, jukebox (8) can do its work as if the resource were its own. Once the jukebox (8) finishes its work, it sends a request to the server to be disconnected from the resource, thus making it available for other jukeboxes (8) in the network.

The order and logic used to provide distribution and access privileges to the ordered resources are controlled by the network operating system which is on server (9).

Thus a switching device such as a hardware or software key allows the network operator to decide whether server (9) shall play the same selection on all devices (8) of the network or to let each device (8) play a different selection. In this latter case, hard disk resources will be accessed time-shared between each device (8), since buffers (56, 57; 66, 67) of each device (8) have sufficient capacity to await subsequent access without there being discontinuity in the audio or visual representation.

Moreover, the multitask operating system, which includes a library containing a set of tools and services, considerably facilitates operation due to its integration in the memory storage and the resulting high degree of flexibility. In particular, this allows a multimedia environment to be created by simply and efficiently managing audio reproduction, video or graphics display, and video animation. In addition, since the audiovisual data are digitized and stored in the server's storage alone, the cost of the network is considerably reduced.

Likewise, transfer of hardware necessary for the telecommunications function of each device (8) on the network server greatly reduces the cost and by using a computer network with a transmission speed of 100 Mbit/s makes it possible to serve simultaneously at least eight devices which can all simultaneously reproduce a different video animation piece on each of the devices, with the knowledge that each video animation requiring a transmission speed of 10 Mbit/s.

This would not have been possible with the ISDN network of patent WO 94/15416, with a transmission speed which is on the order of 1 Mbit/s, insufficient even for video animation. The same applies to any other line for long distance data transmission.

Any modification by one skilled in the art is likewise part of the invention. Thus, regarding buffers, it should be remembered that they can be present either physically in the circuit to which they are assigned or implemented by software by reserving storage space in the system memory.

The invention claimed is:

1. An audiovisual distribution system for playing an audiovisual piece, the audiovisual distribution system comprising:
   a central computer server including:
      a mass storage that stores a plurality of audiovisual pieces,
      a server network card that receives requests for said audiovisual pieces, and a server multitask operating system communicating with said mass storage and said server network card;

a number of buffers linked to respective controller circuits associated to hardware devices, detection means for detecting tasks realization in each of said buffers; and a plurality of audiovisual devices, each including:

at least one of an audio unit and a video unit that effect play of an audiovisual piece, an interface unit that effects communication with a device user, a payment device, a device network card linked to said server network card, and a device multitask operating system module operatively coupled with respectively the audio unit and the video unit, said interface unit, said payment device, and said device network card, and wherein said device network card of each audiovisual device is declared to said device multitask operating system as a peripheral corresponding to a hard disk, said device multitask operating system having at least one hard disk access management task in which the order to play a piece resulting from a selection is processed as a hard disk sequential access task which makes the device network card send a request for said audiovisual pieces, in the form of a hard disk sequential access request, to the server network card, such that each audiovisual device does not include a storage medium for audiovisual pieces.

2. An audiovisual distribution system of claim 1, wherein said detection means comprise a task scheduling module, said server multitask operating system comprising a kernel for managing tasks with a hierarchic order.

3. An audiovisual distribution system of claim 2, wherein each audiovisuals device also comprises a task scheduling module, said device multitask operating system including a kernel for managing tasks with a hierarchic order.

4. An audiovisual distribution system of claim 1, wherein the server multitask operating system processes the hard disk sequential access request as its own requests for disk access.

5. Audiovisual distribution system according to claim 4, wherein the server comprises at least one telecommunications modem.

6. Audiovisual distribution system according to claim 5, wherein the speed of each network card is greater than 10 Mbit/s, and the dimensions of the buffers of the video and sound control circuits allow the exchange of information with a speed of at least 10 Mbit/s in order to produce the video animation on a network containing at least eight audiovisual apparatus.

7. Audiovisual distribution system according to claim 6, wherein the network comprises a number of servers, each associated with a hard disk, and a number of audiovisual apparatus such that the number of servers is at least equal to the number of audiovisual apparatus divided by eight.

8. Audiovisual distribution system according to claim 7, wherein the operating system of each server is associated with a switching means making it possible to decide whether the information provided in response to the request of a network apparatus is delivered to all the network apparatus or only to those apparatus which transmitted a request.

9. Audiovisual distribution system according to claim 8, wherein the server is equipped with audio or video means for playing a piece, payment means and means for interactive communication with a user or the network manager.

10. Audiovisual distribution system according to claim 9, wherein the operating status of the server or respectively the apparatus is held on the hard disk of the server or respectively in the permanent memory of the apparatus.

* * * * *